(12) United States Patent
Chao

(10) Patent No.: US 11,565,413 B2
(45) Date of Patent: Jan. 31, 2023

(54) CLEANING MACHINE AND PATH PLANNING METHOD OF THE CLEANING MACHINE

(71) Applicant: Hobot Technology Inc., Chupei (TW)

(72) Inventor: Chi-Mou Chao, Zhubei (TW)

(73) Assignee: HOBOT TECHNOLOGY INC., Chupei (TW)

(*) Notice: Subject to any disclaimer, the term of this patent is extended or adjusted under 35 U.S.C. 154(b) by 350 days.

(21) Appl. No.: 16/736,049

(22) Filed: Jan. 7, 2020

(65) Prior Publication Data

US 2020/0246970 A1 Aug. 6, 2020

(30) Foreign Application Priority Data

Jan. 31, 2019 (CN) .......................... 201910096907.5

(51) Int. Cl.
*B25J 9/16* (2006.01)
*G05D 1/02* (2020.01)
*B25J 11/00* (2006.01)
*B08B 3/02* (2006.01)

(52) U.S. Cl.
CPC ............ *B25J 9/1664* (2013.01); *B08B 3/024* (2013.01); *B25J 11/0085* (2013.01); *G05D 1/0219* (2013.01); *G05D 1/0272* (2013.01); *G05D 1/0274* (2013.01); *G05D 2201/0203* (2013.01)

(58) Field of Classification Search
CPC .............................................. G05D 2201/0203
See application file for complete search history.

(56) References Cited

U.S. PATENT DOCUMENTS

| | | | |
|---|---|---|---|
| 8,438,695 B2* | 5/2013 | Gilbert, Jr. ............ | A47L 9/0477 15/319 |
| 2005/0010331 A1* | 1/2005 | Taylor .................. | G05D 1/0274 318/568.12 |
| 2005/0251312 A1 | 11/2005 | Tani | |
| 2007/0282484 A1* | 12/2007 | Chung .................. | B25J 19/023 700/245 |
| 2015/0289743 A1* | 10/2015 | Taoka .................... | A47L 9/2826 701/2 |
| 2016/0270618 A1* | 9/2016 | Lu ........................ | A47L 11/4066 |
| 2017/0049288 A1* | 2/2017 | Knutson ............. | A47L 11/4036 |

FOREIGN PATENT DOCUMENTS

WO WO-2016/148743 A1 9/2016
WO WO-2019099253 A1 * 5/2019 ........... A01D 34/008

* cited by examiner

*Primary Examiner* — Jeff A Burke
*Assistant Examiner* — Christopher A Buksa
(74) *Attorney, Agent, or Firm* — Muncy, Geissler, Olds & Lowe, P.C.

(57) ABSTRACT

A cleaning machine and a path planning method of the cleaning machine are provided. According to one embodiment of the invention, a cleaning machine for cleaning a surface is provided. The cleaning machine includes a sensing module and a control system. The sensing module senses an environment of the cleaning machine to obtain map data. The control system divides the map data into multiple blocks, and controls the cleaning machine to perform a first cleaning process and a second cleaning process in a current block of the blocks, and then controls the cleaning machine to move to a next block of the blocks.

16 Claims, 8 Drawing Sheets

CLEANING MACHINE AND PATH PLANNING METHOD OF THE CLEANING MACHINE

CROSS-REFERENCE TO RELATED APPLICATIONS

This application claims priority of No. CN201910096907.5 filed in China on 2019 Jan. 31 under 35 USC 119, the entire content of which is hereby incorporated by reference.

BACKGROUND OF THE INVENTION

Field of the Invention

The invention relates to a cleaning machine and a path planning method of the cleaning machine, and more particularly to a cleaning machine using a cleaning liquid to clean a surface and a path planning method of the cleaning machine.

Description of the Related Art

A mobile cleaning robot uses a distance measuring sensor, a mechanical contact sensor, or a non-contact type distance measuring sensor and the like to construct a map, and to position itself in the map, so that the cleaning robot can determine its position and orientation in the peripheral environment, and plan a cleaning path.

FIG. 1 is a schematic view showing a path planning method of the prior art. FIG. 1 is a schematic view showing the path planning method disclosed by International Patent Publication No. WO2016148743A1. As shown in FIG. 1, a robot 100 according to the prior art uses a sensor to measure walls of a room 300, performs wall following behaviors along the walls in the room 300, and constructs a map after taking a circle around the room 300. More specifically, a controller of the robot 100 generates multiple grids in the map, and the grids include multiple hatch marked units representing non-traversable properties and multiple blanking units representing traversable properties. The robot 100 uses the sensor to measure non-traversable portions, such as the walls, furniture and the like, to form the hatch marked units, and then uses the non-traversable portions to determine and form the traversable blanking units.

Then, the robot 100 plans a cleaning path 410b again, and the controller of the robot 100 performs the attitude calculation to calculate an estimated attitude of the robot 100 and the credibility of the estimated attitude along a path 410b, to calibrate the estimated attitude according to the credibility in a special position in the room, and to perform cleaning of the entire room finally.

U.S. Patent Publication No. US20050251312A1 also disclosed another path planning method. The robot moves forward and turns 180 degrees upon encountering the wall. Then, the robot continues to move forward, and then turns 180 degrees again upon encountering another wall or obstructer. In this manner, the aforementioned behaviors are repeated, and the entire room is cleaned finally. However, this type of cleaning can not effectively clean stains, such as coffee, water, oil or ink. So, the robot still needs to be improved.

BRIEF SUMMARY OF THE INVENTION

An objective of one embodiment of the invention is to provide a cleaning machine using a cleaning liquid to clean a surface and a path planning method of the cleaning machine. An objective of one embodiment is to provide a cleaning machine and a path planning method of the cleaning machine, which can effectively clean stains of the dried coffee, water, oil or ink.

A cleaning machine is used to clean a surface. The cleaning machine includes a liquid spraying module, a sensing module and a control system. The sensing module senses an environment of the cleaning machine to obtain map data. The control system generates at least one blocks in the map data, and controls the cleaning machine to perform a first cleaning process for doing a first cleaning and a second cleaning process for doing a second cleaning in a current block of the at least one blocks. The liquid spraying module sprays a cleaning liquid. The first cleaning process includes using the liquid spraying module to spray the cleaning liquid onto the surface, wherein an interval period between the first cleaning and the second cleaning at a same location in the current block is set as a time within which the second cleaning can be performed before the cleaning liquid has not completely evaporated. In one embodiment, the multiple blocks are preferably present, and the control system further controls the cleaning machine to leave the current block and then to move to a next block of the blocks.

In one embodiment, the cleaning machine further includes at least one cleaning devices. The cleaning device is used to wipe the surface. The second cleaning process includes using the at least one cleaning devices to wipe the surface.

In one embodiment, the first cleaning process further includes using the at least one cleaning devices to wipe the surface, and the second cleaning process further includes using the liquid spraying module to spray the cleaning liquid onto the surface. Preferably, a first moving speed of the cleaning machine in the first cleaning process is lower than a second moving speed of the cleaning machine in the second cleaning process. A first sprayed liquid amount of the cleaning machine in the first cleaning process is greater than a second sprayed liquid amount of the cleaning machine in the second cleaning process.

In one embodiment, the control system further sets multiple boundaries of the current block as multiple virtual walls, enables the cleaning machine to perform the first cleaning process and the second cleaning process in the current block and then to remove the virtual walls, and enables the cleaning machine to enter the next block after the virtual walls have been removed.

In one embodiment, the control system ends the cleaning of the surface when judging that all of the blocks have been cleaned.

According to an embodiment, a path planning method of a cleaning machine applied to a cleaning machine for cleaning a surface is provided, and the method includes the following steps. A sensing module of the cleaning machine is used to sense an environment of the cleaning machine to obtain map data. A control system of the cleaning machine is used to generate at least one blocks in the map data. The control system is used to enable the cleaning machine to perform a first cleaning process for doing a first cleaning and a second cleaning process for doing a second cleaning in a current block of the at least one blocks. The first cleaning process includes: using a liquid spraying module of the cleaning machine to spray a cleaning liquid onto the surface, wherein an interval period between the first cleaning and the second cleaning at a same location in the current block is set as a time within which the second cleaning can be performed before the cleaning liquid has completely evaporated. In one embodiment, preferably, the multiple blocks are present, and the step of performing the first cleaning process and the second cleaning process further includes leaving the current block and then walking to a next block of the blocks.

In one embodiment, the second cleaning process includes using at least one cleaning devices of the cleaning machine to wipe the surface.

In one embodiment, the first cleaning process further includes using the at least one cleaning devices to wipe the surface, and the second cleaning process further includes using the liquid spraying module to spray the cleaning liquid onto the surface. Preferably, a first moving speed of the cleaning machine in the first cleaning process is lower than a second moving speed of the cleaning machine in the second cleaning process. A first sprayed liquid amount of the cleaning machine in the first cleaning process is greater than a second sprayed liquid amount of the cleaning machine in the second cleaning process.

In one embodiment, the step of performing the first cleaning process and the second cleaning process includes the following steps. Multiple boundaries of the current block are set as multiple virtual walls. The virtual walls are removed after the cleaning machine has performed the first cleaning process and the second cleaning process in the current block. The cleaning machine is enabled to leave the current block and then enter the next block after the virtual walls have been removed.

In one embodiment, the path planning method of the cleaning machine further includes ending cleaning the surface when it is judged by the control system that all of the blocks have been cleaned.

In summary, the cleaning machine in an embodiment is enabled to move to the next block after the first cleaning process and the second cleaning process have been performed in the current block. In one embodiment, the cleaning machine sprays the cleaning liquid onto the surface during the first cleaning process, and the cleaning liquid can be immersed into dried stains to soften the stains during the interval period between the first cleaning and the second cleaning at a same location in the block, and the softened stains are removed during the second cleaning, so that stains, footprints, water stains, fine gray particles and the like can be removed more easily. In one embodiment, the boundaries of the current block are set as the virtual walls. Therefore, the algorithm of path planning during the second cleaning can be simplified.

DETAILED DESCRIPTION OF THE INVENTION

Figure 1:
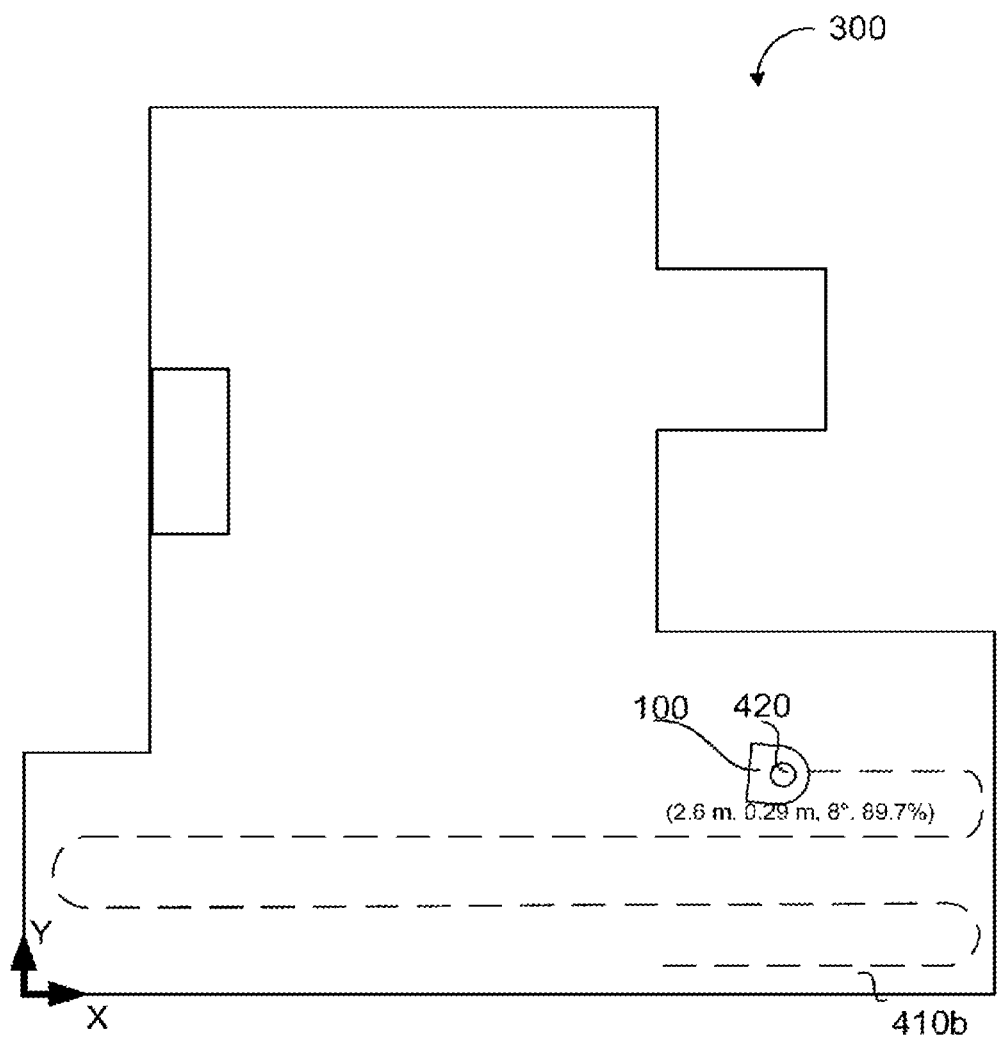
FIG. 1 is a schematic view showing a path planning method of the prior art.
Figure 2:
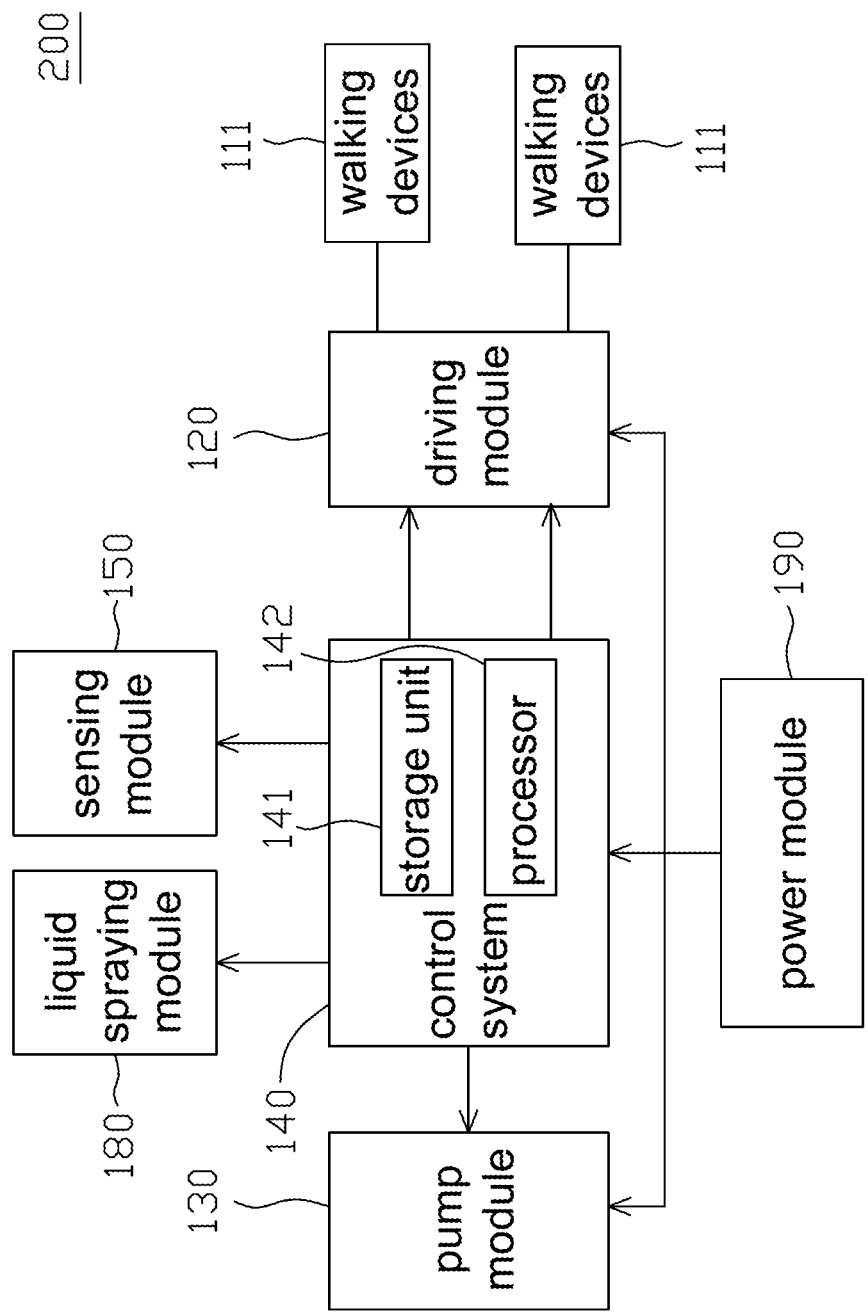
FIG. 2 is a functional block diagram showing a cleaning machine according to one embodiment of the invention.

FIG. 2 is a functional block diagram showing a cleaning machine according to one embodiment of the present invention. Referring to FIG. 2, a cleaning machine 200 in this embodiment includes a power module 190, a sensing module 150, a pump module 130, a driving module 120 and a control system 140. The control system 140 includes a processor 142 and a storage unit 141. The power module 190 is electrically connected to the pump module 130, the driving module 120 and the control system 140 and provides electric power. In one embodiment, the power module 190 may be a battery module, which further includes a battery level sensing module (not shown). When battery level of the cleaning machine 200 is insufficient, the battery level sensing module will give a warning sound or a warning light or automatically return to the charging station for charging. In one embodiment, the power module 190 of the cleaning machine 200 may include a power line to be electrically connected to a socket. The control system 140 is coupled to the pump module 130 and the driving module 120, and the driving module 120 receives a control signal of the control system 140 to drive two walking devices 111 to move, so that the cleaning machine 200 generates a displacement.

The pump module 130 generates a vacuum state so as to suck microparticles on a surface. The sensing module 150 may include at least one of a distance measuring sensor, a mechanical contact sensor or a non-contact type distance measuring sensor for sensing a peripheral environment of the cleaning machine 200 so that the control system 140 can construct a map according to the map planning cleaning path, and store the map into the storage unit 141.

Figure 3:
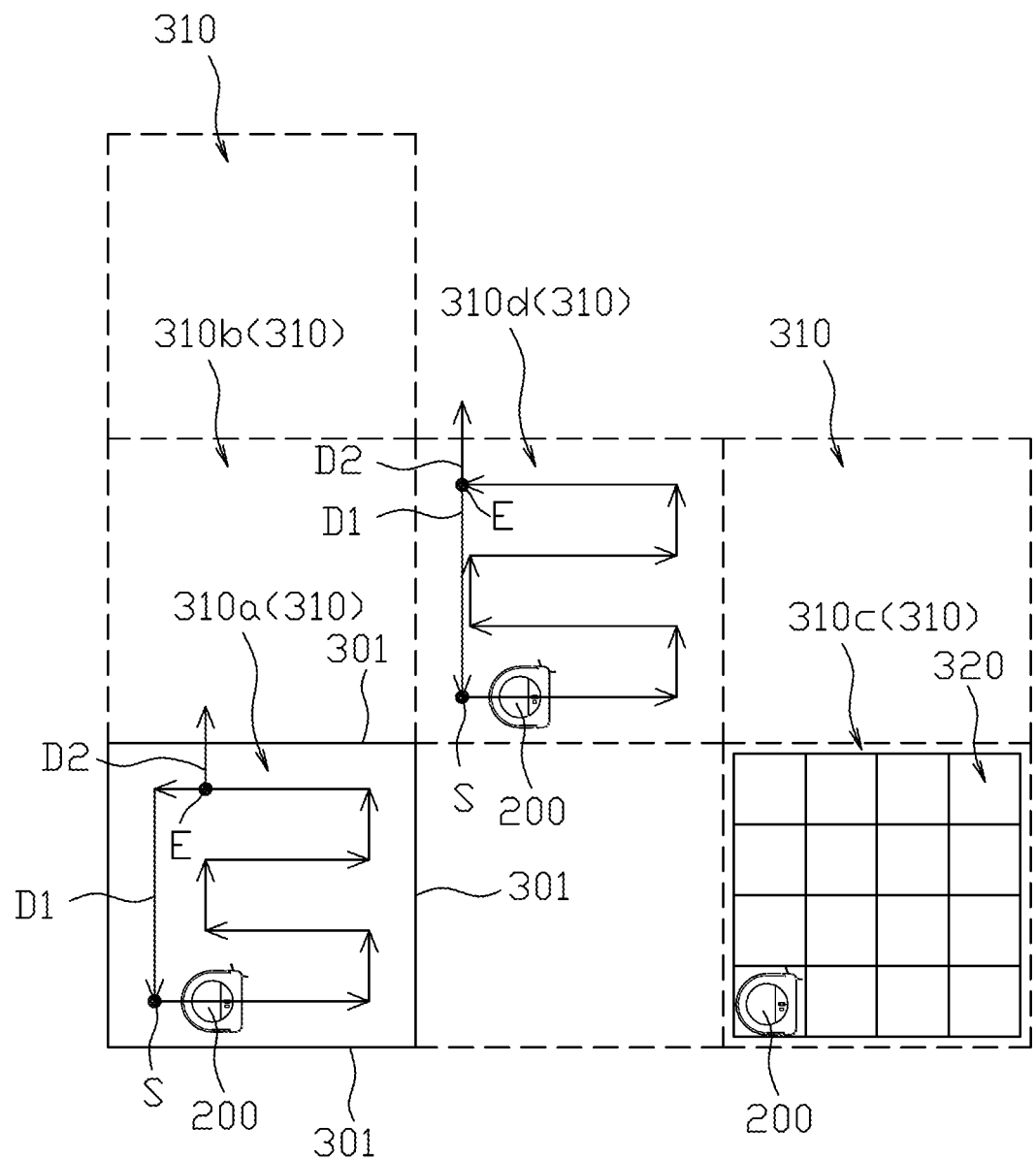
FIG. 3 is a schematic view showing a path according to one embodiment of the invention.

FIG. 3 is a schematic view showing a path according to one embodiment. After the control system 140 senses the peripheral environment of the cleaning machine 200 and construct a measured map, the control system 140 generates multiple blocks 310 in the measured map data in advance, and controls the cleaning machine 200 to perform two or more cleaning processes in each block 310. In one embodiment, the control system 140 plans a walking path within the block 310 according to each block 310, so that the cleaning machine 200 can clean the block 310 two or more times a block clean process. In one embodiment, the control system 140 takes a boundary of a current block 310a as a virtual wall 301. When the cleaning machine 200 encounters the virtual wall 301, the cleaning machine 200 turns by, for example, 180 degrees, without exceeding the current block 310a. After the cleaning machine 200 cleans the current block 310a at the second time, the virtual wall 301 is removed by the control system 140, so that the cleaning machine 200 goes out of the current block 310a and then walks into a next block 310b in the walking direction of D2 in FIG. 3, for example. More specifically, when the cleaning machine 200 starts moving from an initial position S to a position E, the cleaning machine 200 walks in the walking direction of D1 in FIG. 3, and returns to the initial position S to finish a first cleaning process. After the cleaning machine 200 has finished the cleaning of the current block 310a at the first time, the cleaning machine 200 starts moving from the initial position S again to perform a second cleaning process, and goes to the position E. When the cleaning machine 200 reaches the position E, it turns into the walking direction of D2 in FIG. 3, and then walks into a next block.

The virtual wall is not a physical boundary line, and may be a boundary line generated by the cleaning machine 200 and the cleaning machine 200 stipulates that it does not exceed the boundary line. In one embodiment, it is only necessary to let the cleaning machine 200 turn upon encountering the virtual wall 301 without frequently calculating a walking distance of the cleaning machine 200, boundary coordinates of each block 310, coordinates of the cleaning machine 200 and the like. The cleaning machine 200 also does not need to turn at specific coordinates (e.g., boundaries or corners of the block 310 or the like). Therefore, the algorithm of path planning is simplified. In this embodiment, the first cleaning and the second cleaning at the same location within the block 310 are separated from each other by a predetermined time, and the predetermined time is determined by the size of the area of the block 310 and the speed of the cleaning machine 200. It should be understood that the invention is not restricted to the path planning method in the block 310a. In one embodiment, the walked path or location is not adopted again, and the left side of the zigzag path needs to be separated from the first walked path by a distance. In one embodiment, some segments of the walked path may be repeated as shown in the block 310d, for example. In an alternative embodiment, other kinds of path planning methods may be used.

Figure 4:
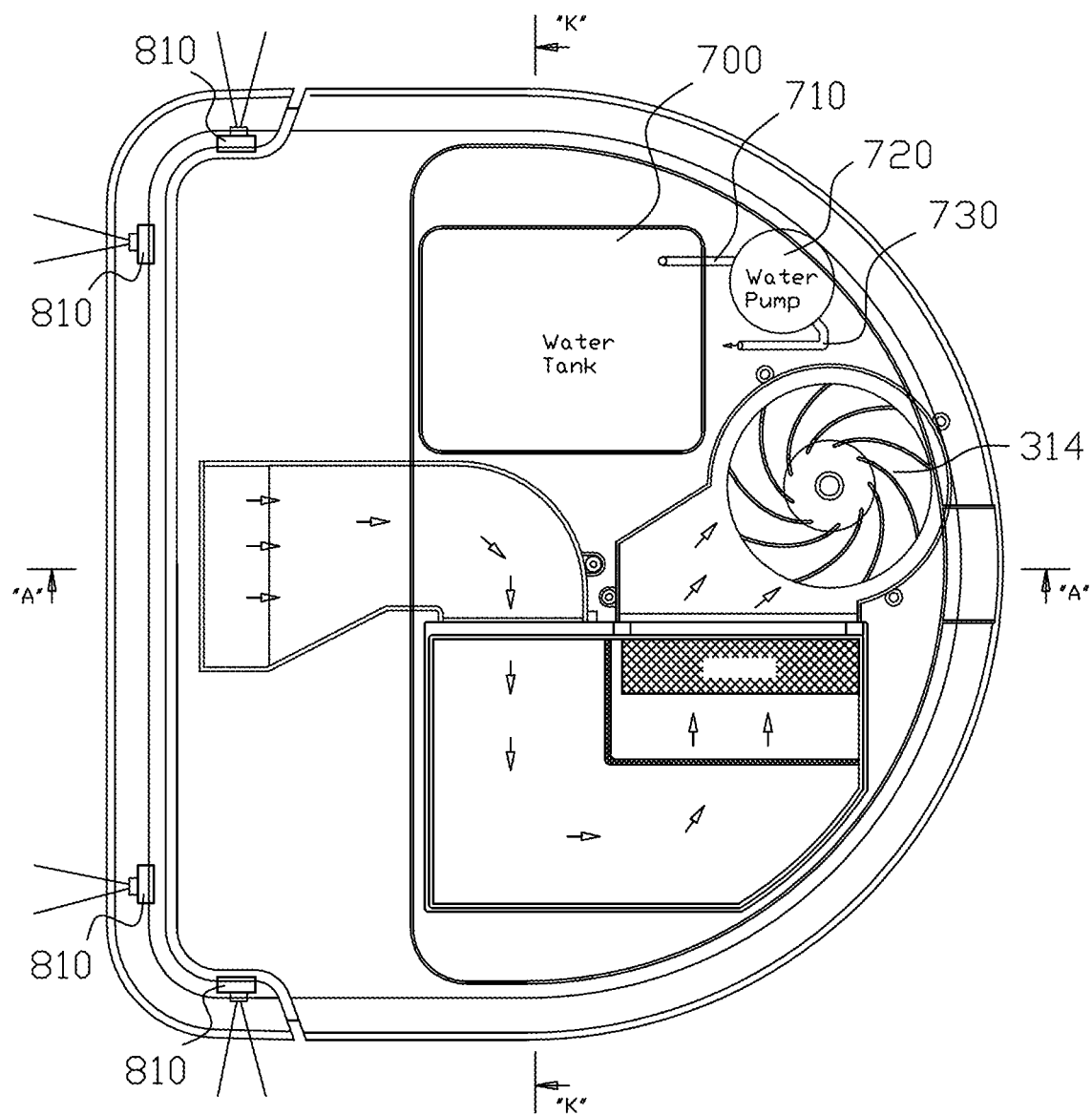
FIG. 4 is a top view showing a cleaning machine according to one embodiment of the invention.
Figure 5A:
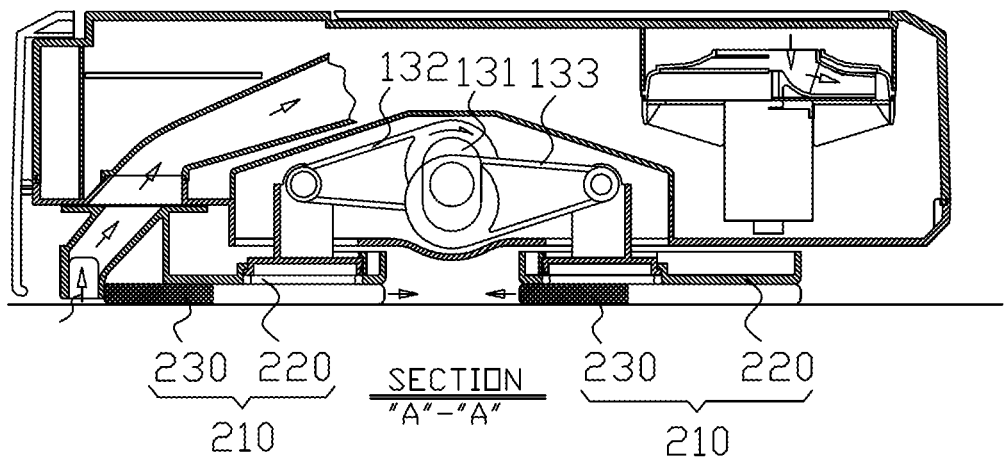
FIG. 5A is a cross-sectional view taken along a cross-section line A-A in FIG. 4.
Figure 5B:
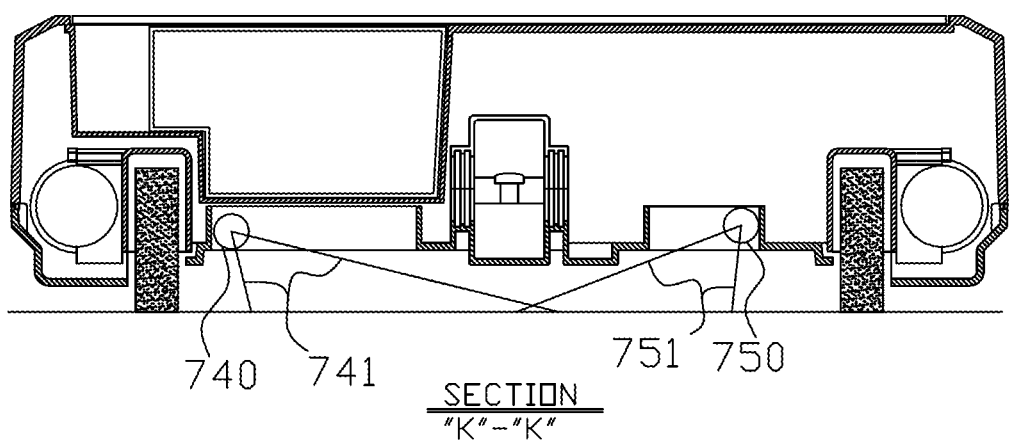
FIG. 5B is a cross-sectional view taken along a cross-section line K-K in FIG. 4.
Figure 6:
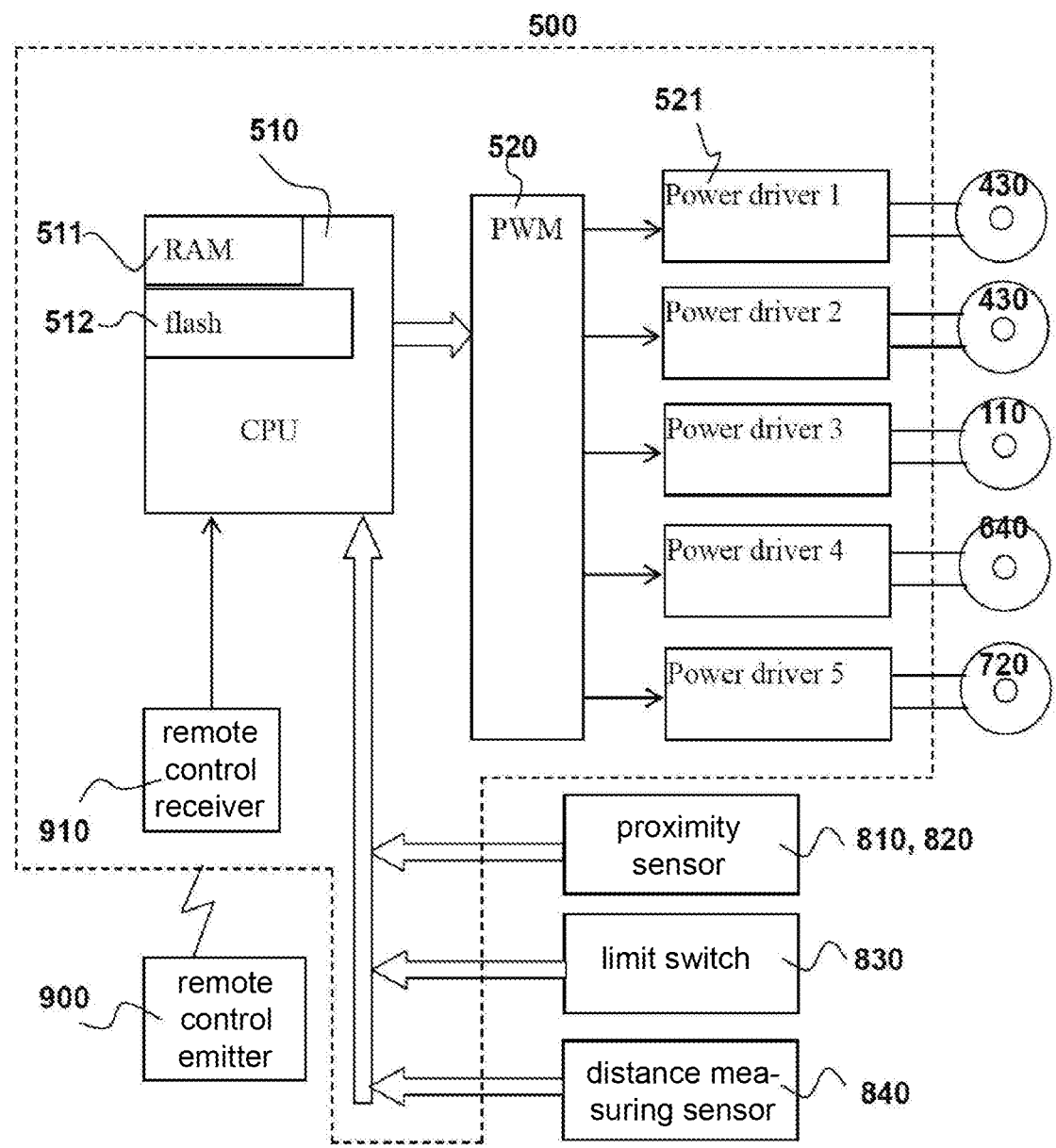
FIG. 6 is a functional block diagram showing a control system according to one embodiment of the invention.

FIG. 4 is a top view showing a cleaning machine according to one embodiment. FIG. 5A is a cross-sectional view taken along a cross-section line A-A in FIG. 4. FIG. 5B is a cross-sectional view taken along a cross-section line K-K in FIG. 4. As shown in FIGS. 4, 5A and 5B, the cleaning machine 200 in one embodiment is further provided with a liquid spraying module 180 for spraying some cleaning liquid to easily remove dirt marks on the ground. In one embodiment, the cleaning liquid may be the liquid, such as water, water added with a surface-active agent, an organic solvent or the like, used for cleaning. As shown in FIGS. 4 and 5B, the liquid spraying module 180 includes a liquid storage tank 700, an inlet pipe 710, a liquid pump 720, an outlet pipe 730, a left nozzle 740 and a right nozzle 750. As shown in FIG. 6 (will be described later), a control system 500 may control the liquid pump 720 to drive to spray the cleaning liquid. As shown in FIG. 4, the cleaning liquid is stored in the liquid storage tank 700 and passes through the inlet pipe 710 to the liquid pump 720. As shown in FIGS. 4 and 5B, the cleaning liquid is compressed by the liquid pump 720, passes through the outlet pipe 730, and then passes through the left nozzle 740 and the right nozzle 750 shown in FIG. 5B for spraying. A symbol 741 denotes a spraying range of the left nozzle 740, and a symbol 751 denotes a spraying range of the right nozzle 750. The control system 500 can control the liquid spraying time and the sprayed liquid amount of the liquid pump 720 according to the walking speed of the machine, so that a cleaning cloth 230 is properly wetted, and the best cleaning effect can be achieved.

As shown in FIGS. 4 and 5A, a wiping motor 110 (shown in FIG. 6) rotates. The rotation of the motor is slowed down through a pulley device and then drives a crank shaft 131 to rotate. The pulley device comprises a wheel that is driven by the wiping motor and carries a flexible belt on its rim. The rotation of the crank shaft 131 drives at least one crank to perform a linear reciprocating motion, and the crank shaft 131 further drives two cranks 132 and 133 to perform the linear reciprocating motion. Preferably, a phase difference between the cranks 132 and 133 is equal to 180°, so that cleaning devices 210 on the ends of the cranks 132 and 133 present the reciprocating linear motion in opposite directions. The cranks 132 and 133 are respectively connected to the cleaning device 210, each of the cleaning devices 210 includes a brush tray 220 and the cleaning cloth 230, and the cleaning cloth 230 is installed or attached to the lower side of the brush tray 220. Free ends of the cranks 132 and 133 push the brush tray 220, so that the cleaning cloth 230 adhered to the brush tray 220 can perform the reciprocating motion on the ground.

The sensing module 150 may include at least one front-side proximity sensor 810, which is disposed at the front end of the cleaning machine 200 and can detect the front-side obstructer to prevent impact. The sensing module 150 further includes at least one bottom-side proximity sensor 820, which is disposed on the bottom side of the casing of the cleaning machine 200, can detect whether there is the cliff disposed ahead and can prevent the cleaning machine 200 from falling over. The proximity sensors 810 and 820 may be infrared sensors, laser distance measurement sensors, ultrasonic sensors or the like, wherein other sensors, which are currently presented or will be developed in the future, may also be used. The sensing module 150 may further include a distance measuring sensor 840, which can have the laser distance measurement function, can measure the distance to the obstructer disposed ahead or measure the distance to the ambient environment, so that the map for the clean path planning can be constructed. The sensing module 150 may further include a limit switch 830. The cleaning machine 200 impacts the obstructer and then presses the limit switch 830, and a microcomputer or processor 510 (will be described later in FIG. 6) will know that the obstructer has been encountered, and perform other operations or motions.

FIG. 6 is a functional block diagram showing a control system according to another embodiment of the invention. As shown in FIG. 6, the control system 500 in another embodiment may include: a processor (CPU) 510, a memory (RAM) 511, a flash memory (flash) 512, a pulse width modulation (PWM) device 520, at least one power driver 521 and a remote control receiver 910. The processor 510, the memory 511 and the flash memory 512 function as the basic modules of microcomputer operation and storage. An operation software is stored in the flash memory 512, the operation software controls the pulse width modulation device 520 to output a power signal to the power drivers 521, and then drive each motors 430, 110, 640 and 720. The walking devices 111 may be tracked wheels connected to two tracked wheel motors 430. The two tracked wheel motors 430 are in charge of walking of the cleaning machine 200, the wiping motor 110 is in charge of reciprocatingly wiping the mechanism, the vacuum pump motor 640 is in charge of vacuuming, and the water pump motor 640 is in charge of spraying the cleaning liquid.

In one embodiment, the control system 140 can frame the cleaning area into the block 310 of 1.5*1.5 meters, and make the robot 200 wipe each block 310 for two or more times. In one embodiment, the robot 200 performs cleaning at a first moving speed at the first time, and performs cleaning at a second moving speed at the second time, wherein the second moving speed is higher than the first moving speed. More specifically, the second moving speed is a normal speed and the first moving speed is a low speed. In one embodiment, the cleaning machine 200 may further include a liquid spraying module 180, the power module 190 is further electrically connected to the liquid spraying module 180.

The cleaning machine 200 controls the liquid spraying module 180 to spray the cleaning liquid to clean a surface upon cleaning, and the cleaning device 210 is used to wipe the surface of the block 310. In one embodiment, the liquid spraying module 180 sprays a first amount of the cleaning liquid upon wiping at the first time, and sprays a second amount of the cleaning liquid upon wiping at the second time, wherein the first amount is greater than the second amount. More specifically, the first amount is a high liquid amount, and the second amount is a normal liquid amount.

Upon the first cleaning, the liquid amount being sprayed is larger, which is mainly for the purpose of letting the liquid immerse into the stains to soften the stains. The objective of the second cleaning is mainly to remove the softened stains. Therefore, an interval period between the first cleaning and the second cleaning at a same location in the block 310 is preferably set as a time within which the second cleaning can be performed before the liquid completely dries out or has completely evaporated. The interval period is determined by the size of the area of the block 310 and the speed of the cleaning machine 200, so that the area of the block 310 cannot be too large. In one embodiment, the length of the block 310 can be set to about 0.5 to 3 meters, and the width of the block 310 can be set to about 0.5 to 3 meters. Preferably, the length thereof can be set to 1 to 2.5 meters, and the width thereof can be set to about 1 to 2.5 meters. More preferably, the length of the block 310 can be set to 1 to 2 meters, the width of the block 310 can be set to about 1 to 2 meters, and the walking speed of the cleaning machine 200 should be properly adjusted. As mentioned hereinabove, the path planning method according to one embodiment of the present invention is a powerful cleaning mode, and can remove stains, footprints, water stains, fine gray particles and the like more effectively. Black coffee stains, which have dried for three days, can be removed according to the applicant's experimental proof.

In one embodiment, a first moving speed of the cleaning machine 200 in the first cleaning process is lower than a second moving speed of the cleaning machine 200 in the second cleaning process. In one embodiment, the first moving speed may range from 5 to 40 cm/second, and the second moving speed may range from 10 to 50 cm/second. Preferably, the first moving speed may range from 5 to 15 cm/second, and the second moving speed may range from 15 to 35 cm/second. More preferably, the first moving speed may range from 5 to 10 cm/second, and the second moving speed may range from 20 to 30 cm/second. In addition, a first sprayed liquid amount of the cleaning machine 200 in the first cleaning process is greater than a second sprayed liquid amount of the cleaning machine 200 in the second cleaning process. In one embodiment, the second sprayed liquid amount may also be substantially equal to zero (that is, no liquid is sprayed). It should be understood that the speed and the sprayed liquid amount are not restricted to the invention, and may be appropriately adjusted by those skilled in the art according to product specifications.

Figure 7:
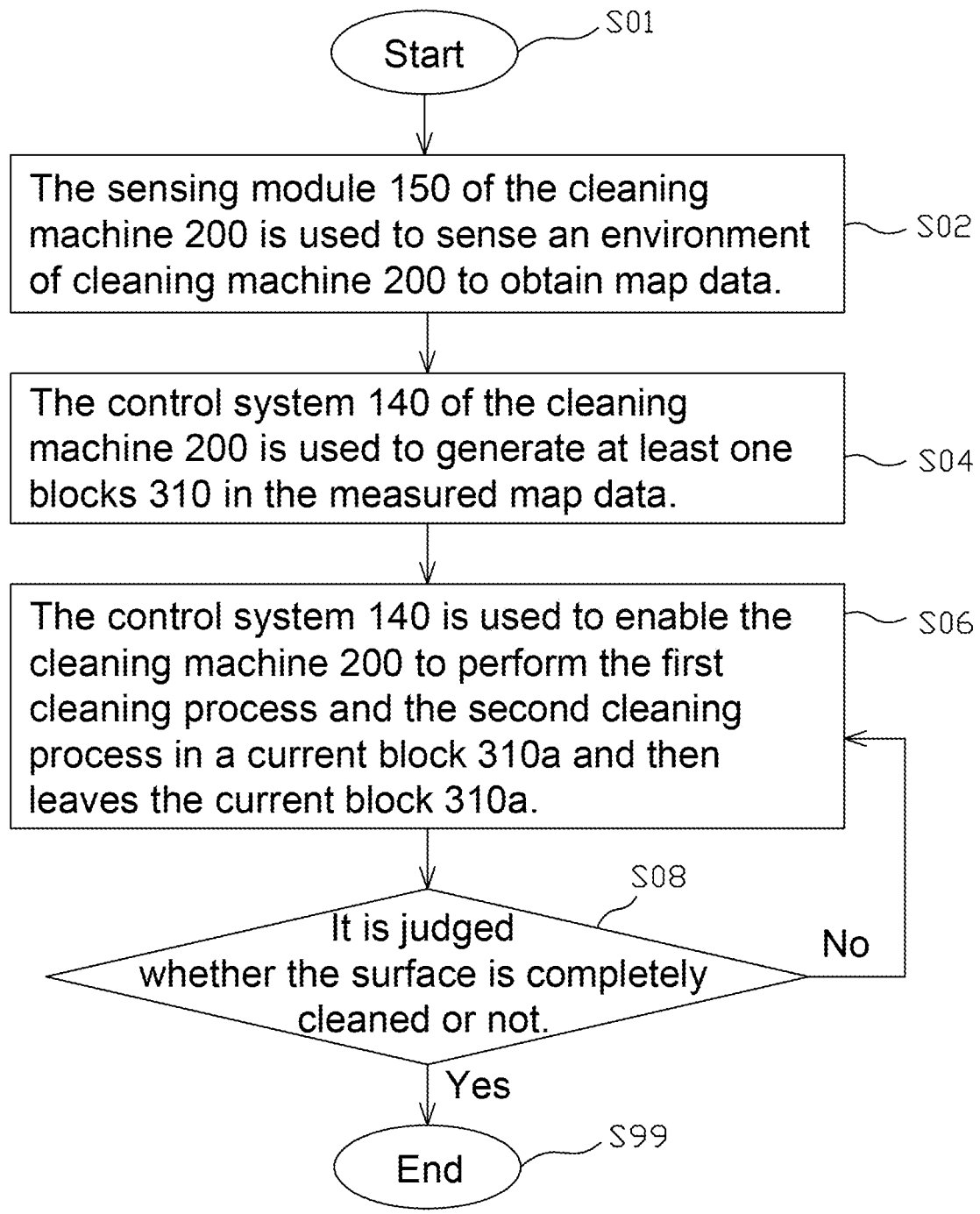
FIG. 7 shows a path planning method of the cleaning machine according to one embodiment of the invention.

A path planning method of the cleaning machine according to one embodiment will be explained in more detail in the following. FIG. 7 shows a path planning method of the cleaning machine according to one embodiment. As shown in FIG. 7, the path planning method of the cleaning machine is adapted to a cleaning machine 200 for cleaning a surface, and the method includes the following steps.

In a step S02, the sensing module 150 of the cleaning machine 200 is used to sense an environment of cleaning machine 200 to obtain map data.

In a step S04, the control system 140 of the cleaning machine 200 is used to generate at least one blocks 310 in the measured map data. In one embodiment, the cleaning machine 200 can use the sensing module 150 to obtain an image, identify stains in the images, and then generate a block 310 including the stains. Preferably, multiple blocks 310 may be formed, and the entire surface of the room is cleaned more than twice.

In a step S06, the control system 140 is used to enable the cleaning machine 200 to perform the first cleaning process and the second cleaning process in a current block 310a. In one embodiment, the cleaning machine 200 leaves the current block 310a thereafter. Preferably, the multiple blocks 310 are present, and after the cleaning machine 200 leaves the current block 310a, the cleaning machine 200 moves to the next block 310b. Preferably, after the cleaning machine 200 has left the current block 310a, the current block 310a is marked as the cleaned block. More specifically, the control system 140 plans the walking path in the block 310 to walk in the block 310 more than twice, and then leaves the current block 310a. It should be understood that although an example that the first cleaning process and the second cleaning process are performed is explained in the above embodiment, the number of cleaning processes of the present invention is not limited thereto, and may also be greater than two. For example, a third cleaning process or even a fourth cleaning process may be further performed, and then the cleaning machine 200 leaves the current block 310a.

In a step S08, it is judged whether the surface is completely cleaned or not. If not, the step S06 is repeated. If yes, the cleaning is ended. In one embodiment, the control system 140 may be used to judge whether there are blocks 310 that have not been cleaned, or not. When there are blocks which have not been cleaned, it is determined that the cleaning is not finished. When there is no block that has not been cleaned, it is judged that the cleaning is finished.

In one embodiment, the first cleaning process includes using the liquid spraying module 180 of the cleaning machine 200 to spray the cleaning liquid onto the surface, wherein an interval period between the first cleaning and the second cleaning at a same location in the block 310 is preferably set as a time within which the second cleaning can be performed before the liquid completely dries out or has completely evaporated. In one embodiment, the second cleaning process includes using the cleaning device 210 of the cleaning machine 200 to wipe the surface. In one embodiment, the first cleaning process may also further include using the cleaning device 210 of the cleaning machine 200 to wipe the surface. In one embodiment, the second cleaning process may also further include using the liquid spraying module 180 of the cleaning machine 200 to spray the cleaning liquid onto the surface. In addition, "the time capable of performing the second cleaning before the cleaning liquid has completely evaporated" relates to the speed of the cleaning machine, the size of the block 310 and the sprayed liquid amount. When the sprayed liquid amount is larger, the time can be longer. When the size of the block 310 is larger, the speed of the cleaning machine can be faster. It should be understood that the invention is not restricted to the specific value of "the time capable of performing the second cleaning before the cleaning liquid has completely evaporated", and it may be appropriately adjusted by those skilled in the art according to product specifications.

Figure 8:
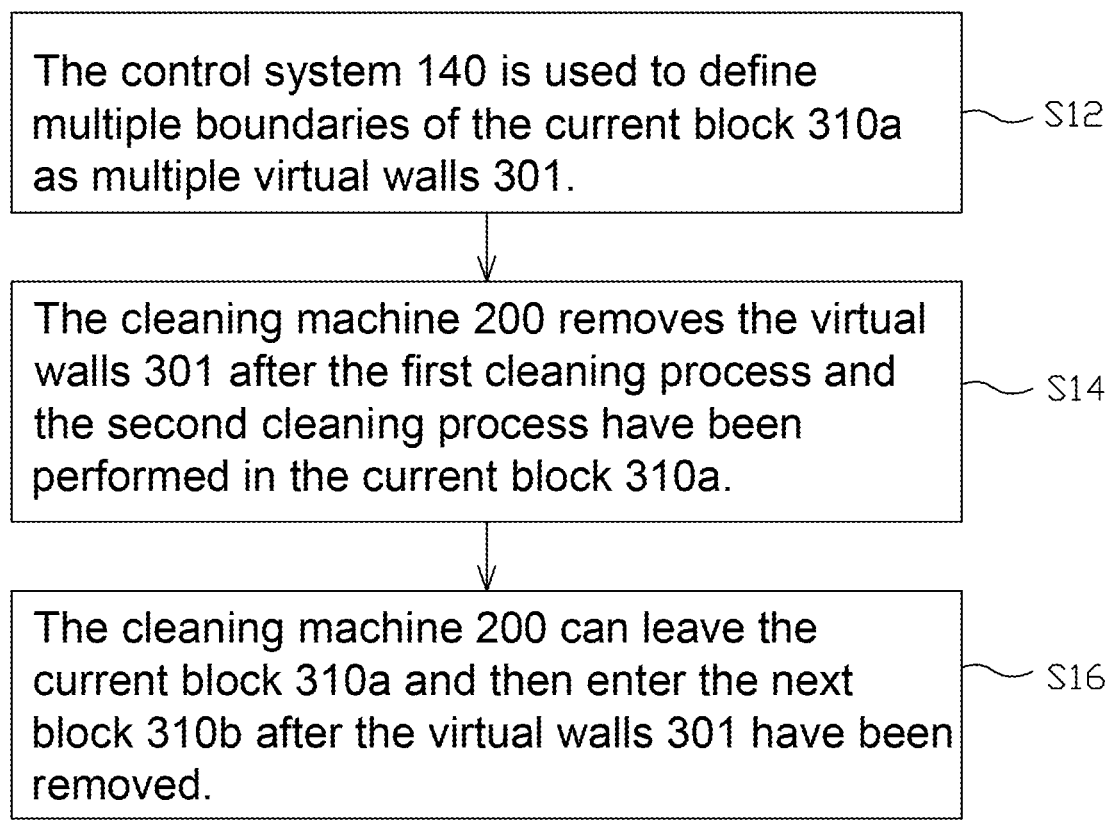
FIG. 8 shows a path planning method of the cleaning machine according to one embodiment of the invention.

It should be noted that the boundary of the each block 310 does not have physical walls or obstructers. Therefore, when no extra calculation of various coordinates is performed, the cleaning machine 200 may exceed the blocks 310 during actual walking and cannot effectively perform the step of "leaving the current block 310a after performing the first cleaning process and the second cleaning process in the current block 310a, and then moving to the next block 310b." To solve this issue, a new path planning method is provided in one embodiment and is explained in more detail as follows. FIG. 8 shows the path planning method of the cleaning machine according to one embodiment of the invention. Please refer to FIGS. 3 and 8. In one embodiment, the step S06 includes the following steps.

In a step S12, the control system 140 is used to define multiple boundaries of the current block 310a as multiple virtual walls 301.

In a step S14, the cleaning machine 200 removes the virtual walls 301 after the first cleaning process and the second cleaning process have been performed in the current block 310a. According to this method, the algorithm of path planning can be simplified, and the cleaning machine only needs to turn when encountering a wall or virtual wall.

In a step S16, the cleaning machine 200 can leave the current block 310a and then enter the next block 310b after the virtual walls 301 have been removed.

Regarding the step S06, the control system 140 can be used to uninterruptedly and continuously obtain the position and walking distance of the cleaning machine 200 in another embodiment. When it is judged that the cleaning machine 200 encounters the boundary of the each block 310a, the cleaning machine 200 rotates or turns, thereby preventing the cleaning machine 200 from going out of or exceeding the current block 310a before the second cleaning process is completed. According to the embodiment, the control system 140 needs to perform more complicated path calculations, and also needs to obtain more accurate position coordinates and walking distance of the cleaning machine 200.

Referring to FIG. 3 again, the cleaning machine 200 in one embodiment can also use the control system 140 to plan multiple grids 320 in a certain block 310c. After the cleaning machine 200 passes thorough a grid 320, the grid 320 is marked as the cleaned or passed unit. In one embodiment, an interval period between the first cleaning and the second cleaning at a same grid 320 in the block 310 is set as a time within which the second cleaning can be performed before the liquid completely dries out. In one embodiment, the size of the grid 320 may be set to have the length ranging from 5 to 30 cm, and the width ranging from about 5 to 30 cm. Preferably, the length may range from 15 to 25 cm, and the width may range from about 15 to 25 cm. More preferably, the length of the grid 320 may range from 18 to 22 cm, and the width may range from about 18 to 22 cm.

In summary, in an embodiment, the cleaning machine 200 moves to the next block 310b after the first cleaning process and the second cleaning process have been performed in the current block 310a. In one embodiment, the cleaning machine 200 sprays the cleaning liquid onto the surface during the first cleaning process, and the cleaning liquid can be immersed into dried stains to soften the stains during the interval period between the first cleaning and the second cleaning at a same location in the block 310, and the softened stains are removed during the second cleaning, so that stains, footprints, water stains, fine gray particles and the like can be removed more easily. In one embodiment, the boundary of the current block 310a is set as the virtual wall 301. Therefore, the algorithm of path planning during the second cleaning can be simplified.

What is claimed is:

1. A cleaning machine for cleaning a surface, the cleaning machine comprising:
    a sensing module for sensing an environment of the cleaning machine to obtain map data;
    a control system for generating at least one blocks in the map data, controlling the cleaning machine to perform a first cleaning process for doing a first cleaning and a second cleaning process for doing a second cleaning in a current block of the at least one blocks, and setting multiple boundaries of the current block as multiple virtual walls;
    at least one cleaning devices for wiping the surface; and
    a liquid spraying module for spraying a cleaning liquid, wherein
        the first cleaning process comprises using the liquid spraying module to spray the cleaning liquid onto the surface,
        the second cleaning process comprises using the liquid spraying module to spray the cleaning liquid onto the surface, and using the at least one cleaning devices to wipe the surface,
        a first sprayed liquid amount of the cleaning machine in the first cleaning process is greater than a second sprayed liquid amount of the cleaning machine in the second cleaning process,
        the length of the current block is set to about 0.5 to 3 meters, and the width of the current block is set to about 0.5 to 3 meters,
        a first moving speed of the cleaning machine in the first cleaning process ranges from 5 to 40 cm/second, and a second moving speed of the cleaning machine in the first cleaning process ranges from 10 to 50 cm/second, and
        an interval period between the first cleaning and the second cleaning at a same location in the current block relates to the first moving speed of the cleaning machine, the size of the current block and the first sprayed liquid amount and is set as a time within which the second cleaning can be performed before the cleaning liquid has completely evaporated,
        wherein the control system further controls the cleaning machine to remove the virtual walls after the first cleaning process and the second cleaning process have been performed in the current block and controls the cleaning machine to leave the current block and then move to a next block of the blocks.

2. The cleaning machine according to claim 1, wherein the first moving speed ranges from 5 to 15 cm/second, and the second moving speed ranges from 15 to 35 cm/second.

3. The cleaning machine according to claim 1, the control system further controls the cleaning machine, in the current block, to move from an initial position S and return to the initial position S to finish the first cleaning process, and move from the initial position S again to perform the second cleaning process.

4. The cleaning machine according to claim 1, wherein the first cleaning process further comprises using the at least one cleaning devices to wipe the surface.

5. The cleaning machine according to claim 1, wherein the control system further controls the cleaning machine to enter the next block after the virtual walls have been removed.

6. The cleaning machine according to claim 1, wherein the control system ends the cleaning of the surface when judging that all of the blocks have been cleaned.

7. The cleaning machine according to claim 1, wherein a first moving speed of the cleaning machine in the first cleaning process is lower than a second moving speed of the cleaning machine in the second cleaning process.

8. The cleaning machine according to claim 1, wherein the virtual walls are configured to let the cleaning machine turn upon encountering the virtual walls without frequently calculating the boundary coordinates of the blocks and the boundary coordinates of the cleaning machine.

9. A path planning method applied to a cleaning machine for cleaning a surface, the method comprising steps of:
    using a sensing module of the cleaning machine to sense an environment of the cleaning machine to obtain map data;

using a control system of the cleaning machine to generate at least one blocks in the map data; and setting multiple boundaries of a current block as multiple virtual walls and using the control system to enable the cleaning machine to perform a first cleaning process for doing a first cleaning and a second cleaning process for doing a second cleaning in the current block of the at least one blocks;

removing the virtual walls after the first cleaning process and the second cleaning process have been performed in the current block and controlling the cleaning machine to leave the current block and then move to a next block of the blocks, wherein the first cleaning process comprises: using a liquid spraying module of the cleaning machine to spray a cleaning liquid onto the surface, the second cleaning process comprises using the liquid spraying module to spray the cleaning liquid onto the surface, and using at least one cleaning devices of the cleaning machine to wipe the surface, a first sprayed liquid amount of the cleaning machine in the first cleaning process is greater than a second sprayed liquid amount of the cleaning machine in the second cleaning process, the length of the current block is set to about 0.5 to 3 meters, and the width of the current block is set to about 0.5 to 3 meters, a first moving speed of the cleaning machine in the first cleaning process ranges from 5 to 40 cm/second, and a second moving speed of the cleaning machine in the first cleaning process ranges from 10 to 50 cm/second, and an interval period between the first cleaning and the second cleaning at a same location in the current block relates to the first moving speed of the cleaning machine, the size of the current block and the first sprayed liquid amount and is set as a time within which the second cleaning can be performed before the cleaning liquid has completely evaporated.

10. The path planning method according to claim 9, wherein the first moving speed ranges from 5 to 15 cm/second, and the second moving speed ranges from 15 to 35 cm/second.

11. The path planning method according to claim 9, wherein the control system further controls the cleaning machine, in the current block, to move from an initial position S and return to the initial position S to finish the first cleaning process, and move from the initial position S again to perform the second cleaning process.

12. The path planning method according to claim 9, wherein the first cleaning process further comprises using the at least one cleaning devices to wipe the surface.

13. The path planning method according to claim 9, wherein the step of controlling the cleaning machine to leave the current block and then move to a next block of the blocks further comprises:

enabling the cleaning machine to leave the current block and then walk into the next block after the virtual walls have been removed.

14. The path planning method according to claim 9, further comprising ending the cleaning of the surface when it is judged by the control system that all of the blocks have been cleaned.

15. The path planning method according to claim 9, wherein a first moving speed of the cleaning machine in the first cleaning process is lower than a second moving speed of the cleaning machine in the second cleaning process.

16. The path planning method according to claim 9, wherein the virtual walls are configured to let the cleaning machine turn upon encountering the virtual walls without frequently calculating the boundary coordinates of the blocks and the boundary coordinates of the cleaning machine.

* * * * *